(12) United States Patent
Tokunaga

(10) Patent No.: US 7,684,691 B2
(45) Date of Patent: Mar. 23, 2010

(54) IMAGE CAPTURE APPARATUS AND CONTROL METHOD THEREOF

(75) Inventor: Tatsuyuki Tokunaga, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 410 days.

(21) Appl. No.: 11/462,553

(22) Filed: Aug. 4, 2006

(65) Prior Publication Data

US 2007/0036531 A1 Feb. 15, 2007

(30) Foreign Application Priority Data

Aug. 12, 2005 (JP) .............................. 2005-234934

(51) Int. Cl.
*G03B 7/08* (2006.01)
*G03B 15/03* (2006.01)
(52) U.S. Cl. ...................... 396/228; 396/157
(58) Field of Classification Search ................. 396/234, 396/228
See application file for complete search history.

(56) References Cited

U.S. PATENT DOCUMENTS

| | | | | |
|---|---|---|---|---|
| 4,727,508 A | * | 2/1988 | Williams | 708/670 |
| 4,969,005 A | | 11/1990 | Tokunaga | 354/414 |
| 5,140,358 A | | 8/1992 | Tokunaga et al. | 354/400 |
| 5,144,359 A | * | 9/1992 | Hayashi et al. | 396/61 |
| 5,258,803 A | | 11/1993 | Hayakawa | 396/123 |
| 5,331,366 A | | 7/1994 | Tokunaga et al. | 354/412 |
| 5,392,091 A | | 2/1995 | Iwasaki | 396/234 |
| 5,461,452 A | | 10/1995 | Iwasaki | 396/51 |
| 5,719,388 A | | 2/1998 | Tokunaga | 250/201.2 |
| 5,742,852 A | * | 4/1998 | Takagi et al. | 396/229 |
| 2003/0206240 A1 | * | 11/2003 | Hyodo et al. | 348/333.03 |
| 2004/0101296 A1 | * | 5/2004 | Nakata et al. | 396/65 |
| 2004/0201730 A1 | * | 10/2004 | Tamura | 348/229.1 |

FOREIGN PATENT DOCUMENTS

| | | |
|---|---|---|
| JP | H03-223821 A | 10/1991 |
| JP | H05-53169 A | 3/1993 |
| JP | 2003-125282 | 4/2003 |

OTHER PUBLICATIONS

English-language translation of Japanese Patent Application No. 2003-125282.
English-language translation of Chinese Office Action dated Jul. 25, 2008, in corresponding Chinese Application No. 2006101097743.

* cited by examiner

*Primary Examiner*—Christopher E Mahoney
*Assistant Examiner*—Leon W Rhodes
(74) *Attorney, Agent, or Firm*—Fitzpatrick, Cella, Harper & Scinto

(57) ABSTRACT

An image capture apparatus includes a photometry unit, which performs photometry of luminance in each of the photometry areas in an image sensing scene, a photometry mode determination unit, which determines a photometry mode, a filter operation unit, which performs an operation on a luminance value of a photometry area by taking into account luminance values of photometry areas around the photometry area, and an exposure value determination unit, which determines an exposure value without using a result of the operation by the filter operation unit when the photometry mode determination unit determines that the photometry mode is a first photometry mode, and when the photometry mode determination unit determines that the photometry mode is a second photometry mode, determines the exposure value by performing an operation in accordance with the second photometry mode after the operation performed by the filter operation unit.

7 Claims, 11 Drawing Sheets

FIG. 10

<TABLE 1>

| FOCAL LENGTH (f) | LVL0 |
|---|---|
| f<40mm | NORMAL REFLECTED LIGHT AT 0.5m |
| 40mm≤f<75mm | NORMAL REFLECTED LIGHT AT 0.8m |
| 75mm≤f<100mm | NORMAL REFLECTED LIGHT AT 1.1m |
| 100mm≤f | NORMAL REFLECTED LIGHT AT 1.4m |

FIG. 11

<TABLE 2>

| RR(i) | W(i) |
|---|---|
| <-2 | 1 |
| -2≤~<-0.5 | 5 |
| -0.5≤~<0 | 10 |
| 0≤~<0.2 | 12 |
| 0.2≤~<0.4 | 11 |
| 0.4≤~<0.6 | 10 |
| 0.6≤~<0.8 | 8 |
| 0.8≤~<1.0 | 6 |
| 1.0≤~<1.5 | 4 |
| 1.5≤~<2.0 | 2 |
| 2.0≤ | 0 |

FIG. 12

| | k(i,01) | k(i,02) | k(i,03) | k(i,04) | k(i,05) | k(i,06) | k(i,07) | k(i,08) | k(i,09) | k(i,10) | k(i,11) | k(i,12) | k(i,13) | k(i,14) | k(i,15) | d(i) |
|---|---|---|---|---|---|---|---|---|---|---|---|---|---|---|---|---|
| S01 FILTER | 3 | 1 | 0 | 0 | 0 | 1 | 0 | 0 | 0 | 0 | 0 | 0 | 0 | 0 | 0 | 5 |
| S02 FILTER | 1 | 4 | 1 | 0 | 0 | 0 | 1 | 0 | 0 | 0 | 0 | 0 | 0 | 0 | 0 | 7 |
| S03 FILTER | 0 | 1 | 4 | 1 | 0 | 0 | 0 | 1 | 0 | 0 | 0 | 0 | 0 | 0 | 0 | 7 |
| S04 FILTER | 0 | 0 | 1 | 4 | 1 | 0 | 0 | 0 | 1 | 0 | 0 | 0 | 0 | 0 | 0 | 7 |
| S05 FILTER | 0 | 0 | 0 | 1 | 3 | 0 | 0 | 0 | 0 | 1 | 0 | 0 | 0 | 0 | 0 | 5 |
| S06 FILTER | 0 | 0 | 0 | 0 | 0 | 4 | 1 | 0 | 0 | 0 | 1 | 0 | 0 | 0 | 0 | 5 |
| S07 FILTER | 1 | 1 | 0 | 0 | 0 | 1 | 6 | 1 | 0 | 0 | 0 | 1 | 0 | 0 | 0 | 10 |
| S08 FILTER | 0 | 0 | 1 | 1 | 0 | 0 | 1 | 6 | 1 | 0 | 0 | 0 | 1 | 0 | 0 | 10 |
| S09 FILTER | 0 | 0 | 0 | 0 | 1 | 0 | 0 | 1 | 6 | 1 | 0 | 0 | 0 | 1 | 0 | 10 |
| S10 FILTER | 0 | 0 | 0 | 0 | 0 | 1 | 1 | 0 | 1 | 4 | 0 | 0 | 0 | 0 | 0 | 7 |
| S11 FILTER | 0 | 0 | 0 | 0 | 1 | 0 | 0 | 1 | 1 | 0 | 3 | 1 | 1 | 0 | 0 | 5 |
| S12 FILTER | 0 | 0 | 0 | 0 | 0 | 0 | 0 | 0 | 0 | 0 | 1 | 4 | 1 | 0 | 0 | 7 |
| S13 FILTER | 0 | 0 | 0 | 0 | 0 | 0 | 0 | 0 | 1 | 0 | 0 | 1 | 4 | 1 | 0 | 7 |
| S14 FILTER | 0 | 0 | 0 | 0 | 0 | 0 | 0 | 0 | 0 | 0 | 0 | 0 | 1 | 4 | 1 | 7 |
| S15 FILTER | 0 | 0 | 0 | 0 | 0 | 0 | 0 | 0 | 0 | 1 | 0 | 0 | 0 | 1 | 3 | 5 |

# IMAGE CAPTURE APPARATUS AND CONTROL METHOD THEREOF

BACKGROUND OF THE INVENTION

1. Field of the Invention

The present invention relates to an image capture apparatus dividing a photographed screen into a plurality of photometry areas to perform the photometry of the luminance of an object in each photometry area, and a control method thereof.

2. Description of Related Art

Japanese Patent Application Laid-Open No. H03-223821 has proposed the following image capture apparatus.

First, a field (or a photographed screen) is divided into a plurality of photometry areas, and the luminance of each area is detected. The plurality of photometry areas is grouped into groups of concentric circles around focus detection areas according to a selection of the focus detection areas detected at a plurality of points of the field, and the photometry value (or the luminance value) of the whole field is operated by changing weighting to the average luminance of the grouped areas. The image capture apparatus aims to perform highly accurate photometry in such a way.

The prior art invention will be simply described with reference to FIGS. 4A, 4B and 4C.

As shown in FIG. 4A, the field (or the photographed screen) is divided into 15 photometry areas S01-S15, and a photometry output signal can be acquired from each of the photometry areas S01-S15. On the other hand, there are three distance measurement points SL, SC and SR, which are areas in which their focus states can be detected. In the case of the distance measurement point SC, the operation of the obtaining of the photometry value is performed by providing performing the operation of a weighted average with larger weighting to the photometry area S08, and an exposure value is determined to perform control. Such photometry is called evaluation photometry.

In a photographing scene in which the main object is dark and the background thereof is bright as shown in FIG. 4B, in order to acquire a photometry output, weighting is provided to the dark main object by providing larger weighting on the photometry area S08 because the distance measurement point is SC. An appropriate exposure amount is acquired for the whole photographed screen by performing the weighting in such a way without the main object becoming inky black.

However, as shown in FIG. 4C, in the case where the dark main object does not cover the whole photometry area S08, which is the photometry area at this time, although the scene is similar to that shown in FIG. 4B, the photometry output becomes high because the photometry value of the photometry area S08 is primarily influenced by the luminance of the bright background. As a result, an exposure value which is considerably high in comparison with that of the case shown in FIG. 4B is obtained. When the exposure value changes greatly in this way in spite of similar scenes, it becomes difficult for a photographer to grasp the peculiarity of the automatic exposure of a camera, and the camera appears to be difficult to use.

Accordingly, the prior art has designed the sensitivity distribution in the field of a photometry sensor to be gentle. FIG. 5B is a diagram showing the sensitivity distribution of the photometry area S08 shown in FIG. 5A in a horizontal one-dimension. The sensitivity distribution of the photometry area S08 is designed to be gentle in such a way, which is equivalent to the use of an optical filter. By using such an optical filter, the change quantity of the photometry values in the photometry area S08 between the scenes of FIGS. 4B and 4C becomes small. Not only is the change in the photometry value of the photometry area S08 small, but also the change in the photometry values of the whole photometry area become small when the framing of the field is subtly shifted with an optical filter. Consequently, the image capture apparatus becomes one having a small change quantity of a final exposure value to be easy for the photographer to use.

However, when the photographer selects a spot photometry mode with the intention of determining an exposure based on only the photometry value of the center photometry area S08 of the photographed screen, the sensitivity distribution of the spot photometry becomes wide in turn owing to the optical filter. Consequently, the photometry value is subjected to a lot of influence of the background luminance of the areas other than the area which the photographer aimed at.

In order to realize a camera which is easily used when the photographer has selected the spot photometry mode, the sensitivity distribution in a photometry area in a photographed screen must be a sharp one as shown in FIG. 5D. If the sensitivity distribution is set in such a way, there is contrary caused a problem of the increase of a change of the exposure amount at the time of subtly shifting the framing of a field in the case of the evaluation photometry mode, which makes the camera appear to be difficult to use.

In order to solve the problem, Japanese Patent Application Laid-Open No. H05-53169 has proposed an image capture apparatus using an area sensor such as a CCD to make it possible to acquire an optimal exposure value independent of the photometry mode.

However, because the area sensor is a charge accumulation type sensor, this sensor has a problem of responsiveness in low luminance conditions, and the use of the area sensor cannot be a good settling method.

SUMMARY OF THE INVENTION

The present invention has been made in consideration of the above situation, and realizes proper exposure control when photographing any scene.

According to the present invention, the foregoing aspect is attained by providing an image capture apparatus comprising: a photometry unit, which performs photometry of luminance in each of the photometry areas in an image sensing screen; a photometry mode determining unit, which determines a photometry mode; a filter operation unit, which performs an operation on a luminance value of a photometry area by taking into account luminance values of photometry areas around the photometry area; and an exposure value determination unit, which determines an exposure value without using a result of the operation by the filter operation unit when the photometry mode determining unit determines that the photometry mode is a first photometry mode, and when the photometry mode determining unit determines that the photometry mode is a second photometry mode, determines the exposure value by performing an operation in accordance with the second photometry mode after the operation performed by the filter operation unit.

According to the present invention, the foregoing aspect is attained by providing a control method of an image capture apparatus, comprising the steps of: performing photometry of luminance in each of the photometry areas in an image sensing screen; determining a photometry mode; performing an operation on a luminance value of a photometry area by taking into account luminance values of photometry areas around the photometry area; and determining an exposure value without using a result of the operation performed in the operation performing step, when the determining step determines that the photometry mode is a first photometry mode, and when the determining step determines that the photometry mode is a second photometry mode, determining the exposure value by performing an operation in accordance with the second photometry mode after the operation performed in the operation performing step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a diagram showing Table 1;

FIG. 11 is a diagram showing Table 2; and

FIG. 12 is a diagram showing the values of k(i, j) and d(i) to each photometry area.

DETAILED DESCRIPTION OF THE PREFERRED EMBODIMENTS

Exemplary embodiments of the present invention will be described in detail in accordance with the accompanying drawings.

In the following an embodiment of an image capture apparatus according to the present invention will be described with reference to the attached drawings. In addition, the following description will be given to an example of applying the present invention to a single-lens reflex camera as the image capture apparatus according to the present invention.

Figure 1:
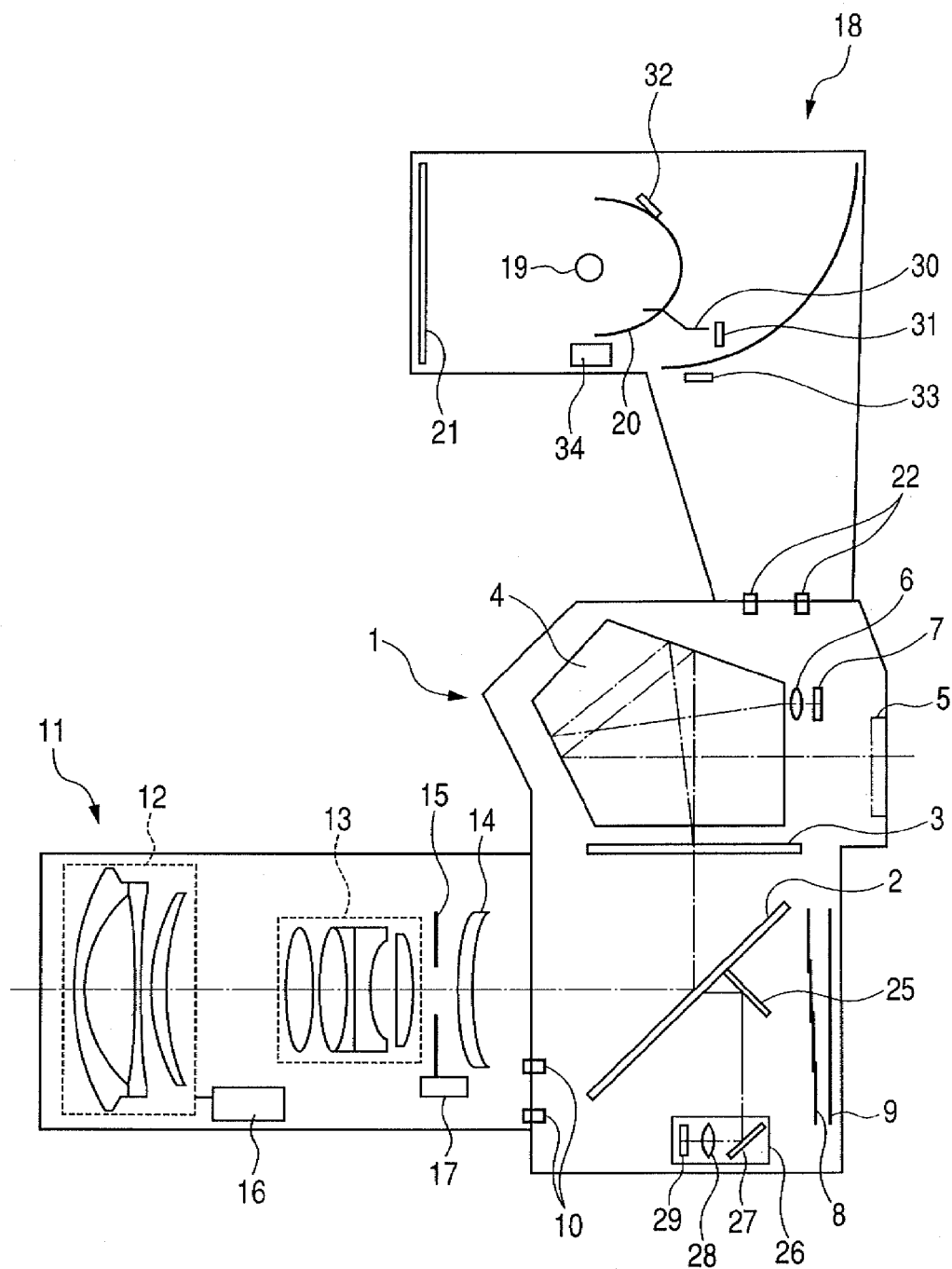
FIG. 1 is a schematic sectional view mainly showing the optical configuration of a single-lens reflex camera according to an embodiment of the present invention.

FIG. 1 is a schematic sectional view mainly showing the optical configuration of the single-lens reflex camera according to the embodiment of the present invention.

The single-lens reflex camera is composed of a camera main body 1, a lens barrel unit 11 mounted on the camera main body 1, and a flash unit 18 mounted on the camera main body 1.

The camera main body 1 therein houses optical components, mechanical components, electrical circuits and the like, and are configured to be able to perform photography.

A main mirror 2 in the camera main body 1 is obliquely installed in a photographing optical path or is withdrawn from the photographing optical path, according to an observation state and a photography state. Moreover, the main mirror 2 is made to be a half mirror, and transmits about a half of a light beam from an object to a focus detection optical system, which will be described later, even when the main mirror 2 is obliquely installed.

A focusing plate 3 in the camera main body 1 is arranged on an estimated focal plane of photographing lenses 12-14. A penta prism 4 is one for changing a finder optical path, and a finder 5 is one for a photographer to observe a photographed screen by observing the focusing plate 3 through the window of the finder 5. An image formation lens 6 and a multi-divided photometry sensor 7 in the camera main body 1 are ones for measuring object luminance in the photographed scene. The image formation lens 6 connects the focusing plate 3 with the multi-divided photometry sensor 7 in conjugation through a reflected optical path in the penta roof prism 4. Here, the image formation lens 6 is located so that the focusing plate 3 and the multi-divided photometry sensor 7 may be almost in focus, and the sensitivity distribution of each photometry area, the photometry of which is performed with the multi-divided photometry sensor 7 is made to be sharp.

Figure 4A:
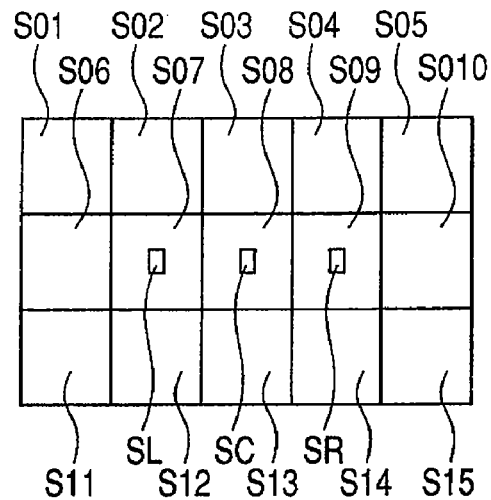
FIGS. 4A, 4B and 4C are diagrams showing each photometry area in a photographed screen on which the photometry of the luminance of an object is performed.
Figure 4B:
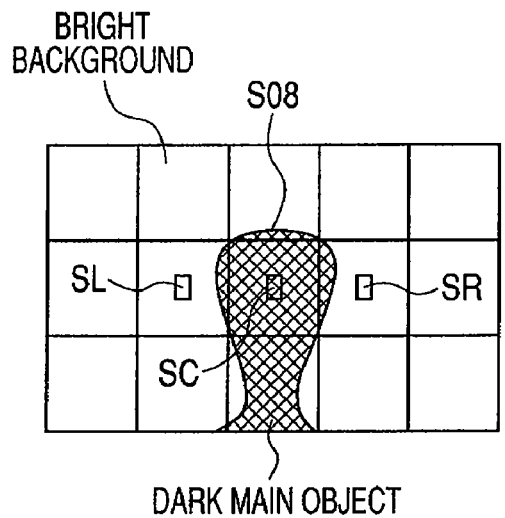
Figure 4C:
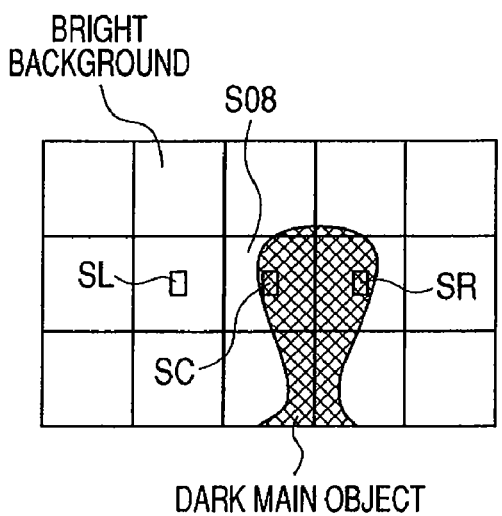
Figure 5A:
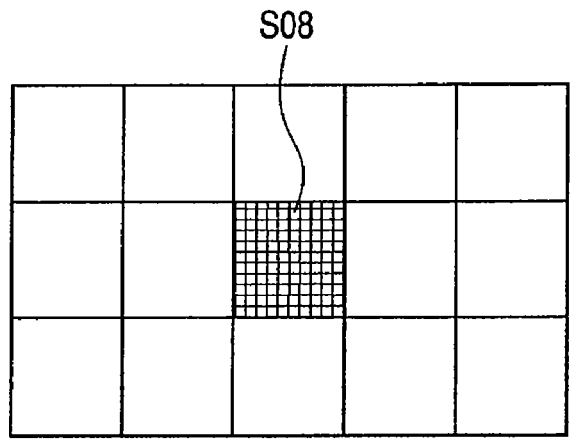
FIGS. 5A, 5B, 5C and 5D are diagrams for illustrating sensitivity distributions of sensors in a photometry area.
Figure 5B:
Figure 5C:
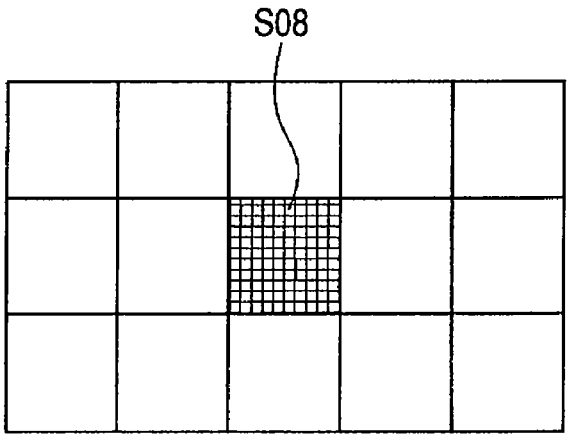
Figure 5D:
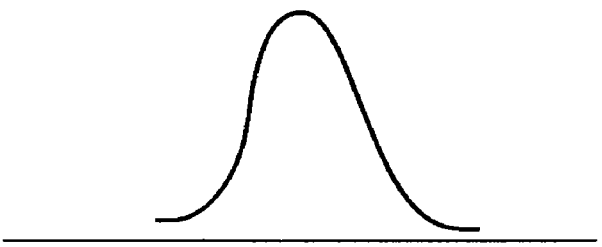

FIG. 4A is a division diagram of the photometry areas of a field (or a photographed screen). As shown in FIG. 4A, the photographed scene is divided into 15 areas of the photometry areas S01-S15. The multi-divided photometry sensor 7 measures the luminance of the object in each of the photometry areas S01-S15 connected with the photographed scene in conjugation.

Returning to FIG. 1, a shutter 8 and a photosensitive member 9 are provided in the camera main body 1. The photosensitive member 9 consists of, for example, an image capture device, such as a CCD and a CMOS sensor, a silver halide film or the like. In the present embodiment, a description will be provided of the configuration using the image capture device such as the CCD and the CMOS sensor as the photosensitive member as an example. Here, the main mirror 2 transmits about the half of the light beam from the object even when it is obliquely installed, as mentioned above. A sub-mirror 25 in the camera main body 1 bends the light beam from the object downward to lead the light beam in the direction of a focus detection unit 26. In the focus detection unit 26, a secondary image formation mirror 27, a secondary image formation lens 28, a focus detection line sensor 29 and the like are provided. A focus detection optical system is composed of the secondary image formation mirror 27 and the secondary image formation lens 28, and the focus detection optical system images a secondary image formation surface of a photography optical system on the focus detection line sensor 29.

The focus detection unit 26 constitutes an automatic focus detection apparatus by detecting a focus state of the object in the photographed scene using a known phase difference detection method by the processing of an electrical circuit, which will be described later, and by controlling the focusing mechanism of the image taking lens. The automatic focus detection apparatus detects the focus states of the object at the three points of the distance measurement points SL, SC and SR in the photographed scene of FIG. 4A.

The lens barrel unit 11 is mounted on the camera main body 1 through lens mounting contact points 10 functioning as interfaces. In the lens barrel unit 11, the photographing lenses 12-14 are provided. To put it concretely, the image taking lens 12 is a first group lens for adjusting a focused position of the photographed scene by moving along the optical axis. The image taking lens 13 is a second group lens for altering the focal length of the image taking lens by moving along the optical axis to perform variable power magnification of the photographed scene.

The image taking lens 14 is a third fixed lens. Furthermore, in the lens barrel unit 11, there are provided a taking lens iris 15, a first group lens drive motor 16 for driving the first group lens 12, and a lens iris drive motor 17 for driving the taking lens iris 15. The first group lens drive motor 16 can automatically adjust a focused position by moving the first group lens 12 along the optical axis according to an automatic focus adjustment operation. The lens iris drive motor 17 can open or stop down the taking lens iris 15.

The flash unit 18 is attached to the camera main body 1 through flash contract points 22 functioning as interfaces, and performs light emission control in accordance with a signal from the camera main body 1. A xenon tube 19 in the flash unit 18 converts electric current energy into light emission energy. A reflection plate 20 and a Fresnel 21 in the flash unit 18 are respective ones for condensing light emission energy efficiently toward the object. A glass fiber 30 in the flash unit 18 leads the light emitted by the xenon tube 19 to a first sensor (PD1) 31 for monitoring. The first sensor (PD1) 31 directly performs the photometry of the light amounts of pre-emission and main light emission in the flash unit 18, and is a sensor for the control of the amount of the main light emission, which is the point of the present invention.

A second sensor (PD2) 32 in the flash unit 18 is also one for monitoring the light emitted by the xenon tube 19. It is possible to limit the emission current of the xenon tube 19 to perform flat light emission of the flash unit 18 according to the output of the second sensor (PD2) 32. A switch 33 in the flash unit 18 is one detecting whether the flash unit 18 is set to be bounce photography or not. An illuminating angle (flash zoom) adjustment mechanism 34 in the flash unit 18 is one for adjusting the illuminating angle of the flash light emission to the focal length of the taking lens to adapt the illuminating angle to the photographed scene by moving the reflection plate 20 before and behind.

FIG. 1 mainly shows only the optical configuration units among the configuration units necessary for realizing the present invention, and additionally necessary electrical configuration units are omitted here.

Figure 2:
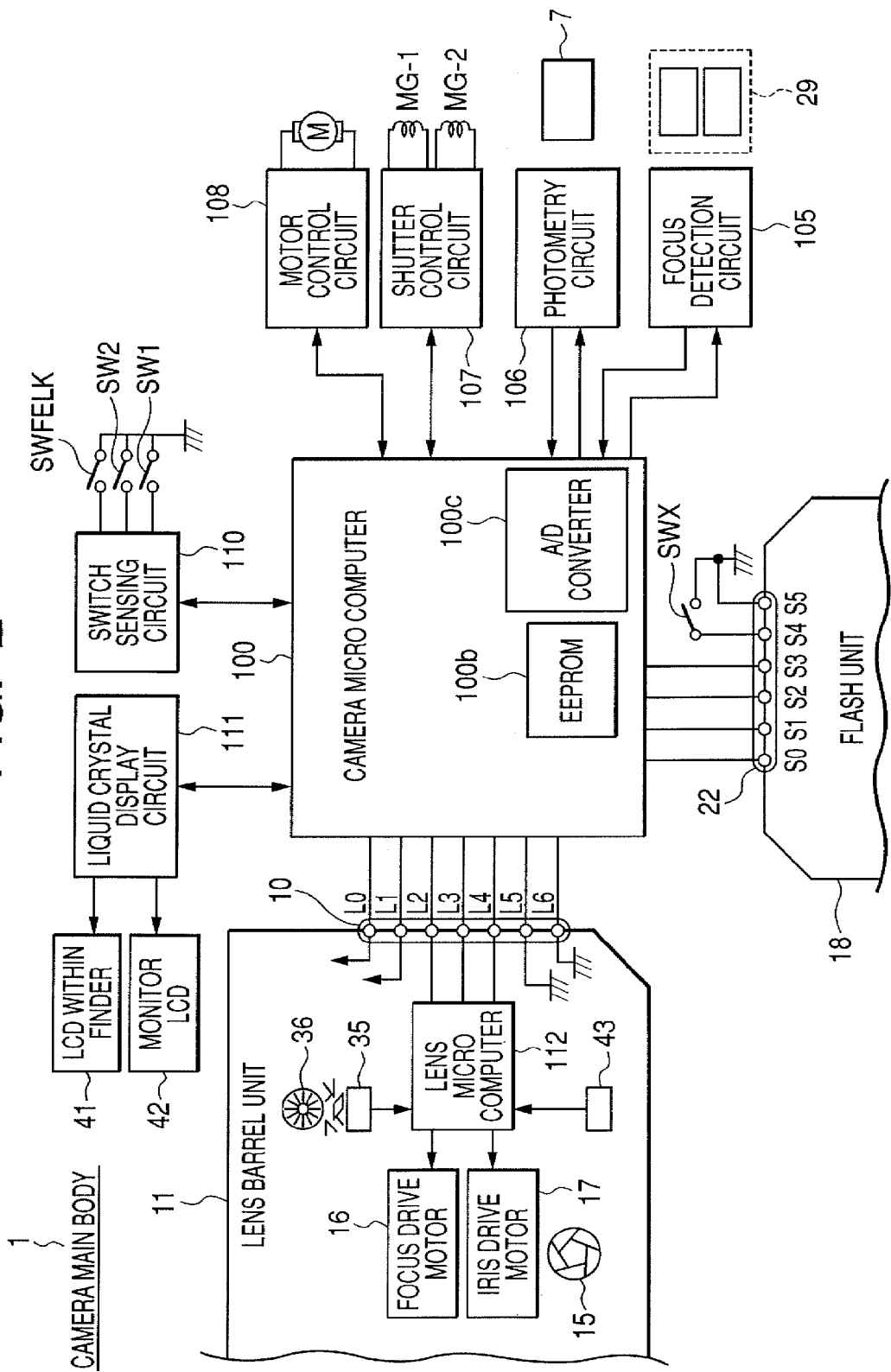
FIG. 2 is a schematic block diagram mainly showing the configuration of electrical components of the single-lens reflex camera according to the embodiment of the present invention.
Figure 3:
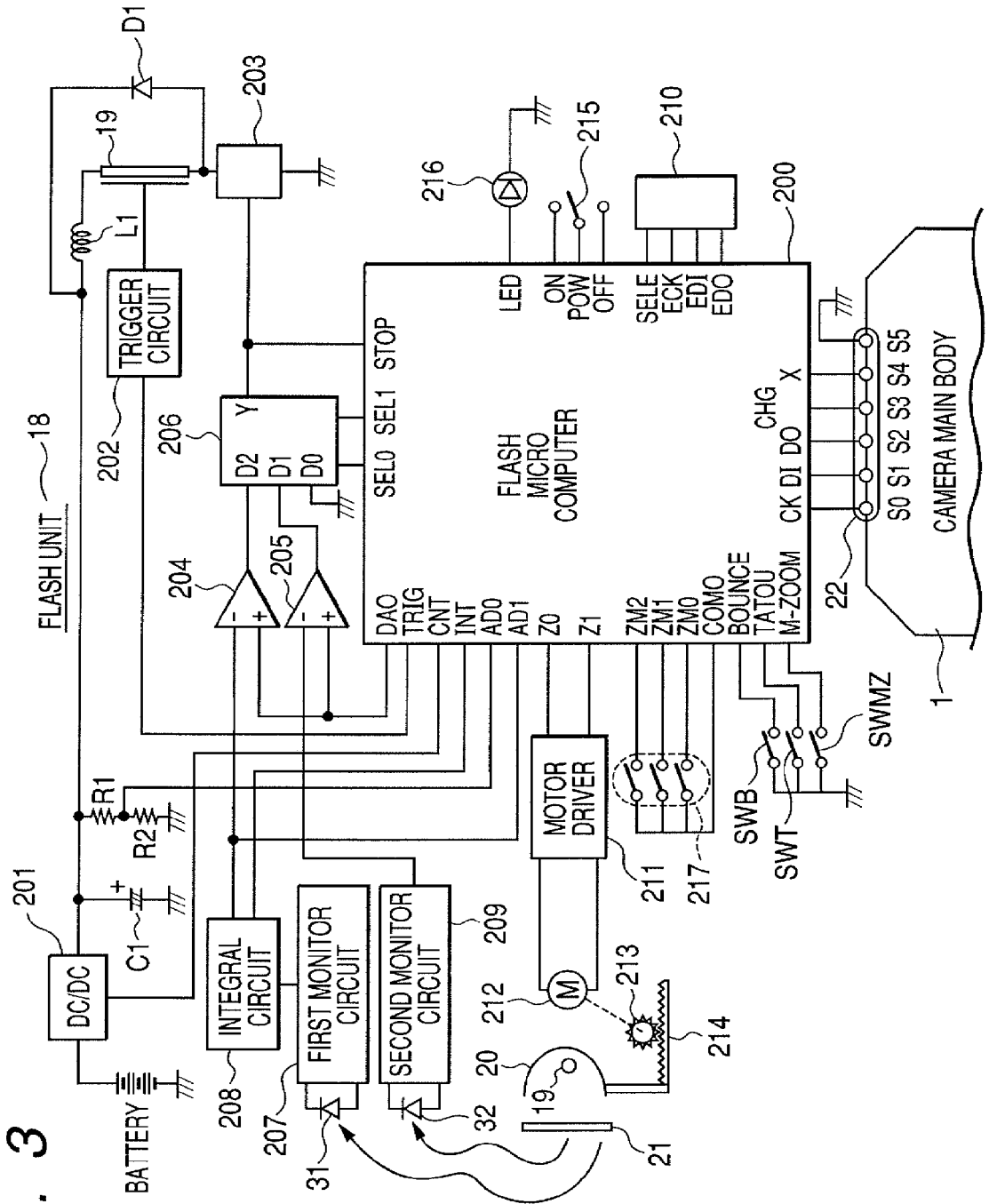
FIG. 3 is a schematic block diagram mainly showing another configuration of electrical components of the single-lens reflex camera according to the embodiment of the present invention.

FIGS. 2 and 3 are schematic block diagrams mainly showing the configuration of electrical components the single-lens reflex camera according to the embodiment of the present invention. Here, FIG. 2 mainly shows the configurations of the electrical components of the camera main body 1 and the lens barrel unit 11, and FIG. 3 mainly shows the configuration of the electrical components of the flash unit 18. Moreover, the same configurations in FIG. 2 and FIG. 3 as those in FIG. 1 are denoted by the same reference numerals as those in FIG. 1.

First, the mainly electronic configuration of the camera main body 1 will be described with reference to FIG. 2.

A camera micro computer 100 controls the operation in the camera main body 1 using predetermined software. An EEPROM 100$b$ in the camera micro computer 100 is one storing photography information. An A/D converter 100$c$ in the camera micro computer 100 is one performing the A/D conversions of analog signals from a focus detection circuit 105 and a photometry circuit 106, which will be described later, and the camera micro computer 100 sets various states by performing the signal processing of the A/D values from the A/D converter 100$c$.

The focus detection circuit 105, the photometry circuit 106, a shutter control circuit 107, a motor control circuit 108, a switch sensing circuit 110, a liquid crystal display circuit 111 and the like are connected to the camera micro computer 100. Moreover, the camera micro computer 100 is connected to the side of the lens barrel unit 11 though the lens mounting contact points 10, and the camera micro computer 100 and the lens barrel unit 11 are configured so as to be able to mutually communicate via signals. Moreover, the camera micro computer 100 is connected to the flash unit 18 through the flash contact points 22, and the camera micro computer 100 and the flash unit 18 are configured so as to be able to mutually communicate via signals.

As described above, the focus detection line sensor 29 is one for detecting the focus states of the object at the three points of the distance measurement points SL, SC and SR in the photographed, scene and deals with each distance measurement point in the secondary image formation surface of the photography optical system as a pair. The focus detection circuit 105 performs accumulation control and read control in the focus detection line sensor 29 in accordance with the control signals from the camera micro computer 100, and outputs photoelectrically converted pixel information to the camera micro computer 100. The camera micro computer 100 performs A/D conversion of the pixel information and focus detection using the phase difference detection method. The camera micro computer 100 performs the focus adjustment of the lens by performing exchanges of signals with a lens micro computer 112 on the basis of the focus detection information.

The photometry circuit 106 outputs a luminance signal in each of the photometry areas S01-S15 in the photographed scene detected by the multi-divided photometry sensor 7 to the camera micro computer 100. The photometry circuit 106 outputs the luminance signals in both states of a steady state in which no pre-emission of flash light to the object is performed, and a pre-emission state in which the pre-emission of flash light is performed to the camera micro computer 100 in the case of flash photography. The camera micro computer 100 performs the A/D conversions of the luminance signals to perform the operation of setting an iris value, the operation of setting a shutter speed, and the operation of setting a flash main light emission amount at the time of exposure, to adjust the exposure of photography.

The shutter control circuit 107 carries out the exposure operation by making a first shutter curtain MG-1 and a second shutter curtain MG-2 run according to the control signals from the camera micro computer 100. The motor control circuit 108 performs the turning up and down of the main mirror 2 and the charging of the shutter 8 by controlling a motor according to the control signals from the camera micro computer 100.

A first switch SW1 is one turned on at a first stroke of a release button (not shown) to start photometry and autofocus (AF). A second switch SW2 is one turned on at a second stroke of the release button (not shown) to start an exposure action. A start switch SWFELK is one turned on by a push switch (not shown) to start the operations of determining a flash light amount and locking by performing the pre-emission of the flash before the exposure operation.

Input signals from the first switch SW1, the second switch SW2, the start switch SWFELK and the other operation members (not shown) of the camera are detected by the switch sensing circuit 110 to be transmitted to the camera micro computer 100. A switch SWX is one turned on with the full opening of the shutter, and is one for transmitting the light emission timing of the main light emission at the time of exposure to the side of the flash unit 18.

The liquid crystal display circuit 111 controls the display of an LCD within finder 41 and a monitor LCD 42 according to the control signals from the camera micro computer 100.

Next, the mainly configuration of the electrical components of the lens barrel unit 11 will be described with reference to FIG. 2.

The lens barrel unit 11 is mutually electrically connected with the camera main body 1 through the lens mounting contact points 10.

The lens mounting contact points 10 are composed of a contact point L0, which is a contact point for a power source of a first group lens drive motor (or a focus drive motor) 16 and a lens iris drive motor 17 in the lens barrel unit 11, and a contact point L1 for a power supply of the lens micro computer 112. Moreover, the lens mounting contact points 10 are also composed of a contact point L2 for a clock for performing serial data communication, a contact point L3 for the data transmission from the camera main body 1 to the lens barrel unit 11, and a contact point L4 for the data transmission from the lens barrel unit 11 to the camera main body 1.

Furthermore, the lens mounting contact points 10 are also composed of a motor grounding contact point L5 for the power sources of the motors, and a grounded contact point L6 for the power source for the lens micro computer 112.

The lens micro computer 112 in the lens barrel unit 11 is connected with the camera micro computer 100 through the lens mounting contact points 10, and operates the first group lens drive motor 16 and the lens iris drive motor 17 to control the focus adjustment and the iris of the lens.

Moreover, a photodetector 35 and a pulse plate 36 are provided in the lens barrel unit 11, and it is possible to acquire the positional information of the first group lens 12 by the counting of the number of pulses from the photodetector 35 with the lens micro computer 112. By this arrangement, the focus adjustment of the lens can be performed, and the absolute distance information of the object can be transmitted to the camera micro computer 100.

Next, the configuration of the electrical components of the flash unit 18 will be described with reference to FIG. 3.

A flash micro computer 200 is one wholly controlling the flash unit 18 in accordance with the control signals from the camera micro computer 100, and performs the control of a light emission amount, the control of the light emission intensity and the light emission time of flat light emission, the control of a light emission illuminating angle, and the like.

A DC/DC converter 201 in the flash unit 18 boosts the voltage of a battery to several hundreds of volts in accordance with an instruction of the flash micro computer 200 to charge a main capacitor C1. Resistances R1 and R2 are voltage dividing resistances provided for monitoring the voltage of the main capacitor C1 by the flash micro computer 200. The flash micro computer 200 performs the A/D conversion of the divided voltage with an A/D converter built in the flash micro computer, indirectly monitors the voltage of the main capacitor C1, controls the operation of the DC/DC converter 201, and controls the voltage of the main capacitor C1 to a predetermined voltage.

A trigger circuit 202 in the flash unit 18 outputs a trigger signal through the flash micro computer 200 based on a control signal from the camera micro computer 100 and a signal from the switch SWX at the time of the flash light emission, and applies a high voltage of several thousand volts to the trigger electrode of the xenon tube 19. As a result, the discharge of the xenon tube 19 is induced, and the charge energy accumulated in the main capacitor C1 is emitted as light energy through the xenon tube 19.

A light emission control circuit 203 in the flash unit 18 is configured of a device using a switching device such as an insulated gate bipolar transistor (IGBT). The light emission control circuit 203 makes a current flow in the xenon tube 19 as a conduction state when a trigger voltage is applied to emit flash light, and intercepts the current to the xenon tube 19 as an interception state to stop the light emission at the time of flash light emission stop.

In the flash unit 18, comparators 204 and 205 are provided. The comparator 204 is used for light emission stop at the time of a flash light emission, which will be described later, and the comparator 205 is used for light emission intensity control at the time of a flat light emission, which will be described later. A data selector 206 in the flash unit 18 selects an input from its input terminals D0-D2 according to selection signals SEL1 and SEL2 from the flash micro computer 200 to output the selected signal from its output terminal Y.

A monitor circuit (or a first monitor circuit) 207 for flash light emission control, included in the flash unit 18 performs the logarithmic compression of an output of the light receiving element 31 consisting of a photodiode or the like, and amplifies the compressed output.

An integral circuit 208 in the flash unit 18 is one integrating the output from the monitor circuit (or the first monitor circuit) 207 for flash light emission control.

A monitor circuit (or a second monitor circuit) 209 for flat light emission control, included in the flash unit 18 amplifies an output of the light receiving element 32 consisting of a photodiode or the like. A storage medium 210 in the flash unit 18 consists of an EEPROM, a flash ROM or the like, and stores the flat light emission time and the like. An LED 216 in the flash unit 18 is used to indicate the possibility of a light emission.

A motor driver 211, a zoom drive motor 212, a pinion gear 213, a rack gear 214, a zoom position detection encoder 217 detecting the position of the reflection plate 20, and the like, shown in FIG. 3, constitute the illuminating angle (flash zoom) adjustment mechanism 34.

A switch SWB is one for detecting whether the flash unit 18 is in the bounce state or not, and corresponds to the switch 33 of FIG. 1.

A switch SWT is a switch operating simultaneously with a button (not shown) for performing setting for using a plurality of flashes in conjunction with one another. A switch SWMZ is a switch operating simultaneously with a manual zoom setting button (not shown). The switch SWMZ is used to perform the setting of an illuminating angle which the photographer wants to set at the time of using a lens which cannot automatically detect focal length information, so that the illuminating angle adjustment mechanism 34 is operated with the flash micro computer 200 by operating the manual zoom setting button. The manual zoom is effective also when the photographer actuates a flash at a flash illuminating angle intentionally different from a photography angle of view to produce a special effect such as illuminating the object with a flash in the state of a spot.

Successively, each terminal of the flash micro computer 200 will be described.

A CK terminal is an input terminal of a synchronous clock to perform serial communication with the camera main body 1. A DI terminal is an input terminal of serial communication data from the camera main body 1. A DO terminal is an output terminal of serial communication data to the camera main body 1. A CHG terminal is an output terminal transmitting the light emission possible state of the flash unit 18 to the camera main body 1 as a current. An X terminal is connected to the switch SWX, and operates as an input terminal of a light emission timing signal from the camera main body 1.

An ECK terminal is an output terminal outputting a communication clock to perform serial communication with the storage medium 210 connected to the outside of the flash micro computer 200. An EDI terminal is an input terminal to input serial data from the storage medium 210. An EDO terminal is an output terminal outputting serial data to the storage medium 210. An SELE terminal is an enabling terminal permitting the communication with the storage medium 210. Here, it is supposed that the application of a low voltage Lo to the SELE terminal enables the communication, and that the application of a high voltage Hi to the SELE terminal disables the communication, for the convenience of description. In addition, although the storage medium 210 is provided in the outside of the flash micro computer 200 in the present embodiment, for example, the storage medium 210 may be built in the flash micro computer 200.

A POW terminal is an input terminal to input a state of a power switch 215. An OFF terminal is an output terminal to make a flash be in an off state at the time of being connected with the power switch 215. An ON terminal is an output terminal to make the flash be in an on state at the time of being connected with the power switch 215. In a power on state, the POW terminal is connected to the ON terminal, and the ON terminal is in a high impedance state and the OFF terminal is in a Lo state at that time. On the other hand, in a power off state, the states of the ON terminal and the OFF terminal are inverse to the states mentioned above, respectively. Moreover, an LED terminal is an output terminal to display a light emission possible state.

A STOP terminal is an input terminal of a light emission stop signal, and is supposed to be in a light emission stop state at the low voltage Lo, for the convenience of description. A SEL0 terminal and a SEL1 terminal are output terminals to instruct the selection of an input in the data selector 206. In the present embodiment, the D0 terminal of the data selector 206 is connected to the Y terminal thereof when a combination of the SEL0 terminal and the SEL1 terminal is (SEL1, SEL0)= (0, 0). Moreover, the D1 terminal is connected to the Y terminal when the combination of the SEL0 terminal and the SEL1 terminal is (SEL1, SEL0)=(0, 1). The D2 terminal is connected to the Y terminal when the combination of the SEL0 terminal and the SEL1 terminal is (SEL1, SEL0)=(1, 0).

A DAO terminal is an output terminal of a D/A converter built in the flash micro computer 200, and outputs the reference levels of the comparators 204 and 205 as analog voltages.

A TRIG terminal is an output terminal of a trigger signal instructing the emission of light to the trigger circuit 202. A CNT terminal is an output terminal controlling an oscillation start and an oscillation stop of the DC/DC converter 201. For the convenience of description it is supposed that the CNT terminal instructs a charge start by the high voltage Hi and a charge stop by the low voltage Lo. An INT terminal is a terminal controlling a start and a reset of integral of the integral circuit 208. For the convenience of description it is supposed that the INT terminal instructs the integral circuit 208 to reset its integral at the high voltage Hi and to permit its integral at the low voltage Lo. An AD0 terminal and an AD1 terminal are A/D input terminals to convert input voltages into digital data so as to be able to be processed in the micro computer 200. The AD0 terminal monitors the voltage of the main capacitor C1, and the AD1 terminal is one for monitoring an integrated output voltage of the integral circuit 208.

A Z0 terminal and a Z1 terminal are control output terminals controlling the motor driver 211 driving the zoom drive motor 212. A ZM0 terminal, a ZM1 terminal and a ZM2 terminal are input terminals to input the signals of the zoom position detection encoder 217. A COM0 terminal is a common terminal for performing a current draw corresponding to the grand level of the zoom position detection encoder 217.

A BOUNCE terminal is an input terminal to input a signal from the switch SWB showing whether the flash unit 18 is in its bounce state or not. A TATOU terminal is an input terminal to input a signal from the switch SWT showing the setting to use a plurality of flashes in conjunction with each other. An M-Zoom terminal is an input terminal to input a signal from the switch SWMZ indicating the setting of a manual zoom.

Successively, the operation of the flash unit 18 will be described while each configuration unit will be described.

Light Emission Possible State Detection

The flash micro computer 200 judges whether or not the voltage of the main capacitor C1 is a predetermined voltage, by which the flash unit 18 can emit light, or more, by performing the AD conversion of a divided voltage of the main capacitor C1, which voltage is input into the AD0 terminal. When the voltage of the main capacitor C1 is the predetermined voltage enabling light emission or more, as a result of the judgment, the flash micro computer 200 draws a predetermined current from the CHG terminal, and a signal indicating the light emission possible state is transmitted to the camera main body 1. Moreover, the flash micro computer 200 sets the LED terminal at the high voltage Hi at this time, and makes the LED 216 emit light to display the light emission possible state.

On the other hand, when the voltage of the main capacitor C1 is less than the predetermined voltage enabling the light emission, the flash micro computer 200 sets the CHG terminal to be nonactive to intercept a current, and a signal indicating the light emission impossible state is transmitted to the camera main body 1. Moreover, the LED terminal is set at the low voltage Lo at this time, and the LED 216 is turned off to indicate the light emission impossible state.

Flash Illuminating Angle Setting

The flash micro computer 200 reads the present zoom position from the inputs to the ZM0-ZM2 terminals, and outputs a predetermined signal through the Z0 terminal and the Z1 terminal by serial communication so that the zoom position may be located at the position instructed by the camera main body 1. Thereby, the motor driver 211 is driven.

Moreover, when the photographer manually sets a flash illuminating angle with the manual zoom setting button (not shown), the flash micro computer 200 makes the motor driver 211 drive the zoom drive motor 212 in accordance with the input to the M-Zoom terminal so that the zoom position may be located at the predetermined zoom position.

Preparatory Flat Light Emission

When the flash unit 18 is in the light emission possible state, the camera main body 1 communicates the emission intensity and the light emission time of the pre-emission, and can instruct pre-emission.

The flash micro computer 200 sets the predetermined voltage at the DAO terminal according to the predetermined emission intensity signal instructed by the camera main body 1.

Next, the flash micro computer 200 outputs the voltages Lo and Hi to the SEL1 terminal and the SEL0 terminal, respectively, and selects the D1 terminal as an input of the data selector 206. Because the xenon tube 19 has not emitted light yet at this time, almost no photoelectric current of the light receiving element 32 flows, and no output of the monitor circuit (or a second monitor circuit) 209 for flat light emission control to be input into the inverting input terminal of the comparator 205 is generated. Moreover, because the output of the comparator 205 is the high voltage Hi, the light emission control circuit 203 enters its conduction state. Next, when a trigger signal is output from the TRIG terminal, the trigger circuit 202 generates a high voltage to excite the xenon tube 19, and then light emission is started.

On the other hand, the flash micro computer 200 instructs the start of an integrating operation 64 the integral circuit 208 after a predetermined time from the generation of the trigger. The integral circuit 208 makes a timer count the predetermined time start at the same time as the start of the integration an output of the monitor circuit (or a first monitor circuit) 207 for flash light emission control, namely the logarithmically compressed photoelectric output of the light receiving element 31 for a light amount integral.

When the pre-emission has been started, a photoelectric current in the light receiving element 32 for light emission intensity control of flat light emission increases, and the output of the monitor circuit (or a second monitor circuit) 209 for flat light emission control rises. Then, when the photoelectric current becomes higher than a reference level set at the non-inverting input of the comparator 205, the output of the comparator 205 is inverted to the low level Lo.

The light emission control circuit 203 intercepts the emission current of the xenon tube 19 to cut off the discharge loop of the xenon tube 19. However, a circulating current loop is formed of a diode D1 and a coil L1, and the emission current gradually decreases after an overshoot caused by the delay of the circuit has been settled.

As the emission current decreases, the emission intensity decreases. Consequently, the high current of the light receiving element 32 decreases, and the output of the monitor circuit (or the second monitor circuit) 209 for flat light emission control decreases. When the output becomes the reference level or less, the output of the comparator 205 is again inverted to the high voltage Hi.

And the light emission control circuit 203 again conducts to form a discharge loop of the xenon tube 19. The emission current increases, and the emission intensity also increases.

In this way, the comparator 205 repeats an increase and a decrease of the emission intensity in a short period around the predetermined reference level set at the DAO terminal, and the control of the flat light emission continuing light emission at a desired almost constant emission intensity can be performed as a result.

When the light emission time timer mentioned above is counted and a predetermined pre-emission time has passed, the flash micro computer 200 sets the SEL1 terminal at the low voltage Lo and sets the SEL0 terminal at the low voltage Lo to select the input of the D0 terminal, i.e., the input of the low voltage Lo, as the input of the data selector 206. As a result, the output of the data selector 206 is forcibly made to be the low voltage Lo, and the light emission control circuit 203 intercepts the discharge loop of the xenon tube 19 to end the light emission.

At the end of the light emission, the flash micro computer 200 reads the output of the integral circuit 208, which has integrated the pre-emission, from the AD1 terminal, which is the A/D input terminal, and the flash micro computer 200 performs the A/D conversion of the read output. Thereby, the photometry integral value at the time of the pre-emission, namely the light emission quantity at the time of the pre-emission, can be read as a digital value (INTp).

Control of Main Light Emission

The camera micro computer 100 acquires a proper relative value (γ) of the main light emission quantity to the pre-emission from the luminance value of the reflected light of the object from the multi-divided photometry sensor 7 at the time of the pre-emission, and transmits the acquired relative value (γ) to the flash micro computer 200. The flash micro computer 200 multiplies the photometry integral value (INTp) at the time of the pre-emission by the proper relative value (γ) transmitted from the camera micro computer 100 of the camera main body 1 to acquire a proper integral value (INTm), and sets the acquired proper integral value (INTm) at the output of the DAO terminal.

Successively, the flash micro computer 200 outputs the high voltage Hi to the SEL1 terminal and the low voltage Lo to the SEL0 terminal, respectively, and selects the D2 terminal as the input of the data selector 206. Because the integral circuit 208 is in the state of operation prohibition at this time, no outputs of the integral circuit 208 to be input into the inverting input terminal of the comparator 204 are generated. Then, the output of the comparator 204 becomes the high voltage Hi, and the light emission control circuit 203 goes into its conduction state.

Successively, when the flash micro computer 200 has output the trigger signal from the TRIG terminal, the trigger circuit 202 generates a high voltage to excite the xenon tube 19, and the light emission of the xenon tube 19 is started.

Moreover, the flash micro computer 200 sets the INT terminal, which is the integral start terminal, at the low voltage Lo after ten-odd μsec from the time of the start of actual light emission when the trigger noises caused by the application of the trigger have been settled.

The integral circuit 208 integrates the output from the first sensor 31 through the monitor circuit (or the first monitor circuit) 207 for flash light emission control.

Then, when the integral output reaches the predetermined voltage set at the DAO terminal, the comparator 204 is inverted, and the conduction of the light emission control circuit 203 is intercepted through the data selector 206 to stop the light emission. On the other hand, the flash micro computer 200 monitors the STOP terminal. When the STOP terminal is inverted to stop light emission, the flash micro computer 200 sets the SEL1 terminal at the low voltage Lo, and sets the SEL0 terminal at the low level Lo. Then the flash micro computer 200 sets the SEL1 terminal and the SEL0 terminal in a forced light emission prohibition state. Together with that, the flash micro computer 200 inverts the INT terminal, which is the integral start terminal, to the high voltage Hi, and ends the integration of the integral circuit 208 to end the light emission processing. In this way, it is possible to control the main light emission to have a proper light emission quantity.

Next, the operation of the single-lens reflex camera according to the present embodiment of the present invention will be described with reference to FIGS. 6-9. The control operation of the camera micro computer 100 will be mainly described as the center of the operation of the single-lens reflex camera shown in FIGS. 6-9. In addition, the case of detecting a focus state at a distance measurement point SC of FIG. 4A will be exemplified as an example in the description of the flowcharts of FIGS. 6-9.

Figure 6:
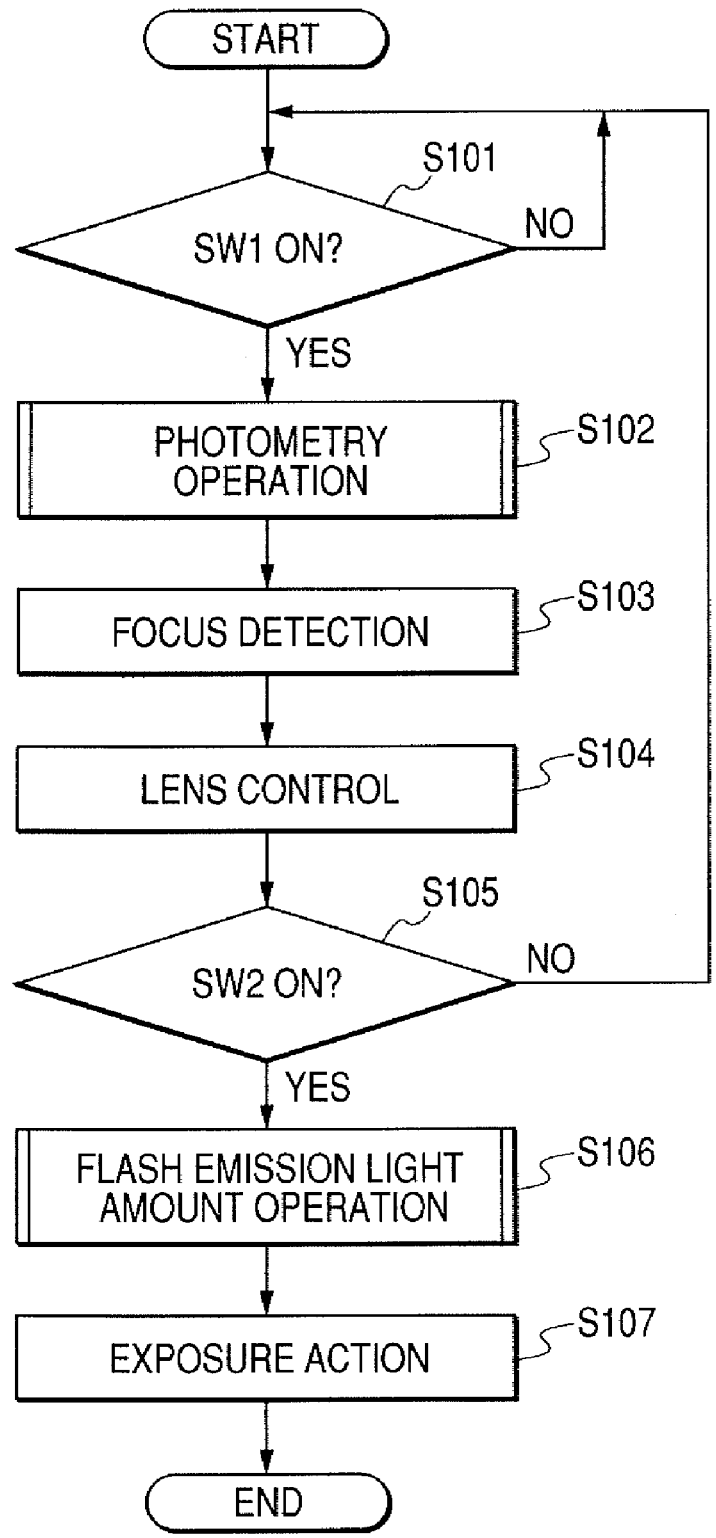
FIG. 6 is a flowchart showing the operation of the single-lens reflex camera according to the embodiment of the present invention.

FIG. 6 is a flowchart showing the operation of the single-lens reflex camera according to the embodiment of the present invention.

In FIG. 6, when the operation of the single-lens reflex camera is started, the camera micro computer 100 first determines whether the first switch SW1, which turns on the first stroke of the release button, is on or not at Step S101. The camera micro computer 100 repeats the operation at the Step S101 until the first switch SW1 is determined to be on. When the first switch SW1 is judged to be on, the camera micro computer 100 advances its processing to that at Step S102.

Successively, at Step S102, the camera micro computer 100 performs the A/D conversion of the luminance signal (or a luminance value) of an object in each of the photometry areas S01-S15 in the photographed scene from the photometry circuit 106. And, the camera micro computer 100 performs the photometry operation of acquiring the shutter speed and the iris value which are used for an exposure action, which will be described later, based on the luminance signal subjected to the A/D conversion. The details of the photometry operation processing will be described later with reference to FIG. 7.

Successively, at Step S103, the camera micro computer 100 drives the focus detection line sensor 29 and the focus detection circuit 105 to detect the focus state of the object at the distance measurement point SC by using the well-known phase difference detection method. Here, in the present embodiment, the focus state is detected at the distance measurement point SC of FIG. 4A. However, there is a plurality of distance measurement points SL, SC and SR in the camera as mentioned above. Consequently, as the method to select the distance measurement point at which the focus detection is performed, there are the case of the method enabling the photographer to set a distance measurement point arbitrarily, the case of a well-known automatic selection algorithm method using the principle of the priority of a near point as a basis, and the like.

Successively, at Step S104, the camera micro computer 100 performs communication with the lens micro computer 112 of the lens barrel unit 11 so as to be in-focus at a selected distance measurement point (the distance measurement point SC in the present embodiment) to perform the focus adjustment of the lens.

And the camera micro computer 100 acquires the absolute distance information relative to the in-focus position of the lens and the absolute distance information from the object by the communication with the lens micro computer 112.

Successively, at Step S105, the camera micro computer 100 determines whether the second switch SW2, which is turned on the second stroke of the release button, is on or not. When the second switch SW2 is not on, i.e., the second switch SW2 is off, as the result of the determination, the camera micro computer 100 returns its processing to Step S101, and repeats the operation from Step S101 to Step S104 until the second switch SW2 is determined to be on. On the other hand, when the second witch SW2 is determined to be on, the camera micro computer 100 advances its processing to Step S106 of a release operation.

Successively, when the processing enters the release operation, at Step S106, the camera micro computer 100 performs the operation of the light emission quantity in the flash unit 18. The details of the operation processing of the light emission quantity in the flash unit 18 will be described later with reference to FIGS. 8 and 9.

Successively, at Step S107, the camera micro computer 100 performs an exposure operation.

That is, the camera micro computer 100 makes the main mirror 2 move up withdraw from the photographing optical path together with the sub-mirror 25, and controls the photographing lenses 12-14 and the taking lens iris 15 by means of the lens micro computer 112. And the camera micro computer 100 controls the shutter control circuit 107 so that the shutter speed may take a determined shutter speed value (TV). At this time, the switch SWX turns on synchronously with the fully opening of the shutter, and the signal generated by the turning on of the switch SWX is transmitted to the flash unit 18. The signal functions as an instruction for main light emission. And the flash micro computer 200 sets the proper integral value (INTm), mentioned above, based on a proper relative value (γ) transmitted from the camera micro computer 100 to perform the control of the main light emission.

After that, the camera micro computer 100 makes the main mirror 2 and the like, which have withdrawn from the photographing optical path, move down to obliquely set them in the photographing optical path again. Then, the camera micro computer 100 drives the motor control circuit 108 to end the flowchart shown in FIG. 6.

Figure 7:
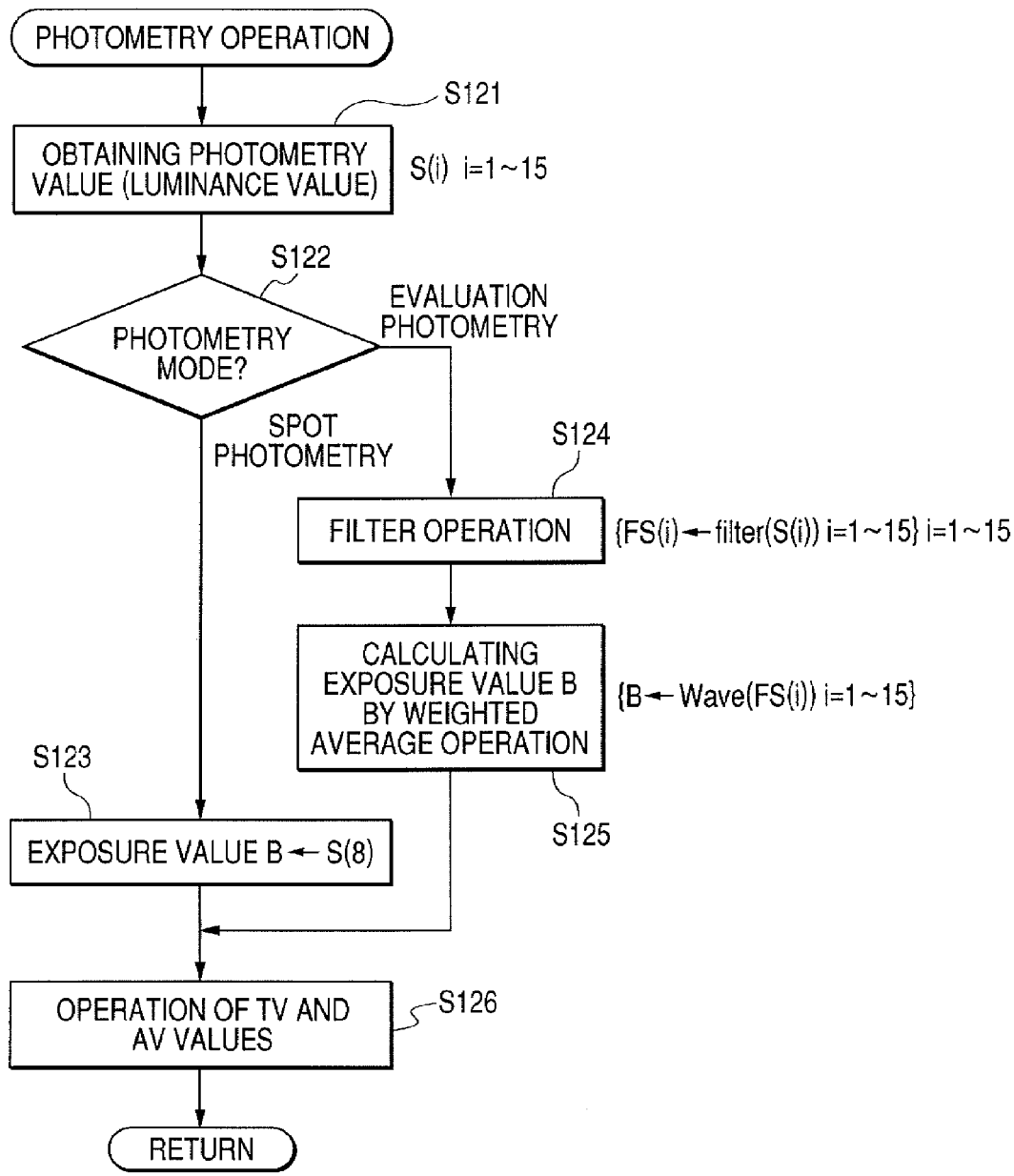
FIG. 7 is a flowchart showing detailed processing of photometry operation processing shown at Step S102 of FIG. 6.

Next, the subroutine of the photometry operation processing shown at Step S102 of FIG. 6 will be described. FIG. 7 is a flowchart showing the detailed processing of the photometry operation processing shown at Step S102 of FIG. 6.

First, at Step S121, the camera micro computer 100 acquires the luminance value of the object in each of the photometry areas S01-S15 from the multi-divided photometry sensor 7 through the photometry circuit 106. And the camera micro computer 100 stores the acquired luminance value in each of the photometry areas S01-S15 into the RAM built in the camera micro computer 100. At this time, the camera micro computer 100 stores the luminance values in each of the photometry areas S01-S15, for example, in the manner shown in the following.

S(i) (hereupon, i=1-15 in the present embodiment, and correspond to each of the photometry areas S01-S15 of FIG. 4A)

The S(i) indicates a value acquired by performing the logarithmic compression of the luminance value, and is expressed to be one step when the light amount increases twofold. By using the logarithmically compressed value, the luminance values of a dynamic range of about 20 steps from a very dark scene to a very bright scene can be expressed by means of simple numeral values. Consequently, the value S(i) is generally used in the operation of photometry.

Successively, at Step S122, the camera micro computer 100 determines which photometry mode has been selected by the photographer with the operation member (not shown). In the present embodiment, the spot photometry mode and the evaluation photometry mode can be set as the photometry mode. When the photometry mode is the spot photometry mode as the result of the determination, the camera micro computer 100 advances its processing to Step S123. On the other hand, when the photometry mode is the evaluation photometry mode, the camera micro computer 100 advances its processing to Step S124.

When the photometry mode is determined to be the spot photometry mode at Step S122, the camera micro computer 100 advances its processing to Step 5123.

Because the camera micro computer 100 is in the spot photometry mode at Step S123, the camera micro computer 100 substitutes an exposure value B for S(8), which is the luminance value of the photometry area S08 including the distance measurement point SC at which the focus state is detected, for the exposure value B as it is.

On the other hand, when the photometry mode is judged to be the evaluation photometry mode at Step S122, the camera micro computer 100 advances its processing to Step S124.

A Step S124, the camera micro computer 100 performs averaging processing on the luminance value of the photometry area S08 including the distance measurement point SC, at which the focus state is detected, by taking into account the luminance values of the photometry areas adjacent to the photometry area S08, among the luminance value of each of the photometry areas S01-S15.

And a filter operation is performed based on the result of the average processing. The filter operation is one performed so that the effect corresponding to that in the case of using an optical filter may be acquired.

In the following, the filter operation at Step S124 will be described in detail.

First, as shown in the following formula, the value of each S(i) is converted from a logarithmically compressed value to a linear value.

$$LS(i) \leftarrow 2^{S(i)} \text{ (here, } i=1\text{-}15 \text{ in the present embodiment)}$$

Next, as shown in the following formula, the filter operation is performed by performing the averaging processing on the luminance value of the photometry area of a predetermined photometry area by taking into account the luminance values of the photometry areas adjacent to the predetermined photometry area.

$$FLS(i) \leftarrow \{\Sigma k(i,j) \times LS(i)\} \div d(i) \text{ (here, } i=1\text{-}15 \text{ in the present embodiment)}$$

Moreover, the k(i, j) and d(i) in the above formula take the values shown in FIG. 12.

Next, because FLS(i) in the above formula becomes a linear value, the linear value is again converted to the logarithmically compressed value as shown in the following formula.

$$FS(i) \leftarrow \text{Log}_2 FLS(i)$$

In this way, the filter operation at Step S124 is performed. In addition, if the photographing mode is set to, for example, the portrait mode even when the photometry mode is the evaluation photometry mode, the filter operation may be omitted for the areas S01, S05, S06, S10, S11 and S15. The reason of the omission is that, if the photographing mode is set to the portrait mode, the probability that the main object moves to the end of the photographed scene is low.

Successively, at Step S125, the camera micro computer 100 performs a weighted average operation performing weighting of the photometry area S08 including the distance measurement point SC, at which the focus state is detected, after the filter operation at Step S124, and calculates the exposure value B. In the following, the calculation of the exposure value B at Step S125 will be described concretely.

In the case where the distance measurement point at which the focus state is detected is the distance measurement point SC shown in FIG. 4A (the case of the example of the present embodiment), the weighted average operation shown in the following formula is performed to calculate the exposure value B.

$$B \leftarrow [8 \times FS(8) + 4 \times \{FS(3) + FS(7) + FS(9) + FS(13)\} + \{FS(1) + FS(2) + FS(4) + FS(5) + FS(6) + FS(10) + FS(11) + FS(12) + FS(14) + FS(15)\}] \div 34$$

Moreover, in the case where the distance measurement point, at which the focus state is detected, is the SL shown in FIG. 4A, the weighted average operation shown in the following formula is performed to calculate the exposure value B.

$$B \leftarrow [8 \times FS(7) + 4 \times \{FS(2) + FS(6) + FS(8) + FS(12)\} + \{FS(1) + FS(3) + FS(4) + FS(5) + FS(9) + FS(10) + FS(11) + FS(13) + FS(14) + FS(15)\}] \div 34$$

Moreover, in the case where the distance measurement point, at which the focus state is detected, is the SR shown in FIG. 4A, the weighted average operation shown in the following formula is performed to calculate the exposure value B.

$$B \leftarrow [8 \times FS(9) + 4 \times \{FS(4) + FS(8) + FS(10) + FS(14)\} + \{FS(1) + FS(2) + FS(3) + FS(5) + FS(6) + FS(7) + FS(11) + FS(12) + FS(13) + FS(15)\}] \div 34$$

As described above, in the case where the filter operation is not performed in a part of the photometry areas, the average operation is performed using the value of the S(i) to the photometry areas. In the present embodiment, a weighting of 8 times is performed to the luminance value of the photometry area including the distance measurement point, at which the focus state is detected, and a weighting of 4 times is performed to the luminance values of the photometry areas adjacent on the left, the right, the top and the bottom of the photometry area including the distance measurement point, at which the focus state is detected. Furthermore, the additions of the luminance values of the other photometry areas as they are to perform their average operation, and thereby the calculation of the exposure value B, is performed.

In addition, the weighted average operation at Step S125 performs the weighted average of the logarithmically compressed values as they are. The reason is that such an algorithm is considered in consideration of the case of a scene in which bright and dark areas exist in a photographed scene. If such a weighted average operation is performed as the values of a linear system, the weighted average operation is easily influenced by the bright one, and it is feared that many under exposed photographs are produced.

Successively, at Step S126, the camera micro computer 100 performs the operation of determining a shutter speed (TV value) and an iris value (AV value) on the basis of the exposure value B, and the photometry operation processing shown at Step S102 of FIG. 6 is finished.

Figure 8:
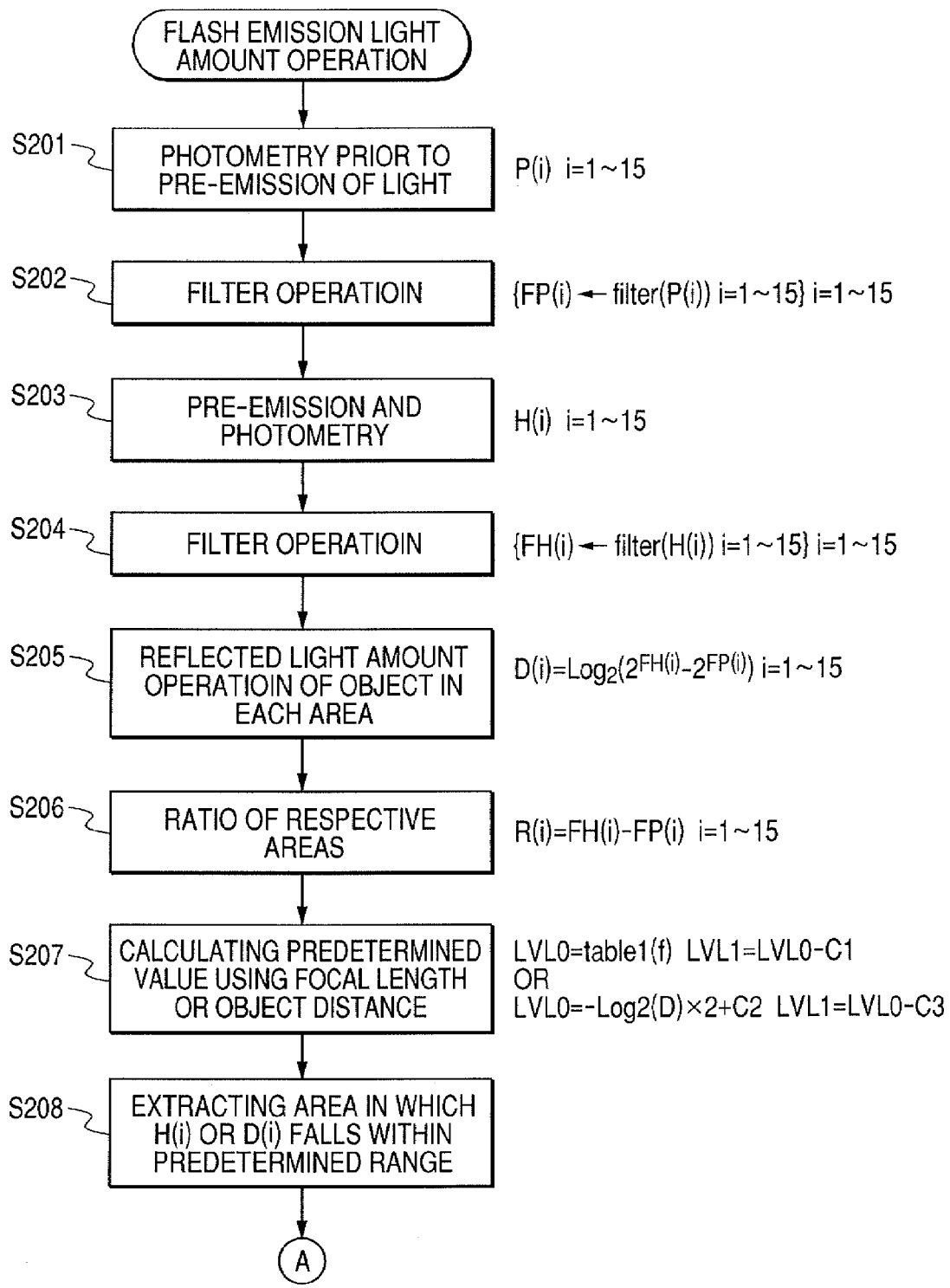
FIG. 8 is a flowchart showing detailed processing of flash emission light amount operation processing shown at Step S106 of FIG. 6.
Figure 9:
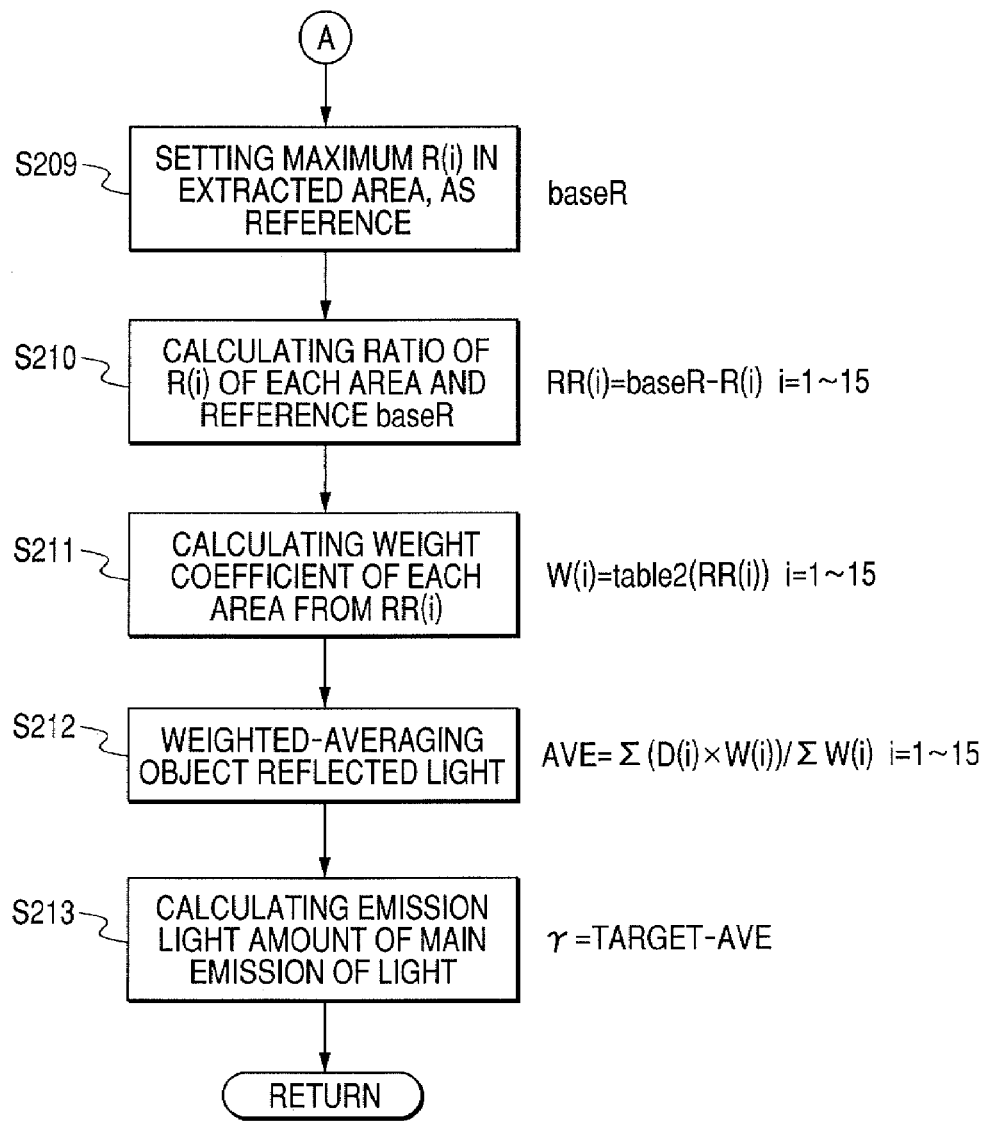
FIG. 9 is a flowchart showing the detailed processing of the flash emission light amount operation processing shown at Step S106 of FIG. 6 successively to the processing shown in FIG. 8.

Next, a subroutine of the flash emission light amount operation processing shown at Step S106 of FIG. 6 will be described. FIGS. 8 and 9 are flowcharts showing the detailed processing of the flash emission light amount operation processing shown at Step S106 of FIG. 6.

First, at Step S201, the camera micro computer 100 acquires the luminance value of the object in each of the photometry areas S01-S15 just before the pre-emission from the multi-divided photometry sensor 7 through the photometry circuit 106. Then, the camera micro computer 100 stores the acquired luminance value in each of the photometry areas S01-S15 into the RAM built in the camera micro computer 100. At this time, the camera micro computer 100 stores the luminance value of each of the photometry areas S01-S15, for example, shown as follows.

$$P(i) \text{ (here, } i=1\text{-}15 \text{ in the present embodiment)}$$

The P(i) is also the value obtained by performing the logarithmic compression of a luminance value similarly to the S(i) mentioned above, and the value increases by one when the luminance becomes doubled.

Successively, at Step S202, the camera micro computer 100 performs a filter operation similarly at Step S124.

In the following, the filter operation at Step S202 will be concretely described.

First, as shown in the following formula, the value of each P(i) is converted from the logarithmically compressed value thereof to the linear value thereof.

$$LP(i) \leftarrow 2^{P(i)} \text{ (here, } i=1\text{-}15 \text{ in the present embodiment)}$$

Next, as shown in the following formula, the filter operation is performed by performing averaging processing on the luminance value in a predetermined photometry area, by taking into account the luminance values of the photometry areas adjacent to the predetermined photometry area.

$$FLP(i) \leftarrow \{\Sigma k(i,j) \times LP(i)\} \div d(i) \text{ (here, } i=1\text{-}15 \text{ in the present embodiment)}$$

Moreover, the k(i, j) and d(i) in the above formula take the values shown in FIG. 12.

Next, because the FLP(i) of the above formula is a linear value, the value is again converted to a logarithmically compressed value as shown in the following formula.

$$FP(i) \leftarrow \text{Log}_2 FLP(i)$$

In this way, the filter operation at Step S202 is performed.

Successively, at Step S203, the camera micro computer 100 executes the instruction of pre-emission to the flash unit 18. The flash micro computer 200 executes the pre-emission operation in conformity with the instruction, as mentioned above. Furthermore, at Step S203, the camera micro computer 100 acquires the luminance value of the object in each of the photometry areas S01-S15 from the multi-divided photometry sensor 7 through the photometry circuit 106 while the flat light emission of the pre-emission continues. Then, the camera micro computer 100 stores the acquired luminance value in each of the photometry areas S01-S15 into the RAM built in the camera micro computer 100.

At this time, the camera micro computer 100 stores the luminance value in each of the photometry areas S01-S15, for example, as shown in the following.

$$H(i) \text{ (Here, } i=1\text{-}15 \text{ in the present embodiment)}$$

The H(i) is also a value acquired by logarithmically compressing the luminance value similarly to the P(i) mentioned above.

Successively, at Step S204, the camera micro computer 100 executes the filter operation similarly at Step S202.

In the following, the filter operation at Step S204 will be concretely described.

First, as shown in the following formula, the value of each H(i) is converted from the logarithmically compressed value thereof to the linear value thereof.

$$LH(i) \leftarrow 2^{H(i)} \text{ (here, } i=1\text{-}15 \text{ in the present embodiment)}$$

Next, as shown in the following formula, the filter operation is performed by performing averaging processing on the luminance value in a predetermined photometry area, by taking into account the luminance values of the photometry areas adjacent to the predetermined photometry area.

$$FLH(i) \leftarrow \{\Sigma k(i,j) \times LH(i)\} \div d(i) \text{ (here, } i=1\text{-}15 \text{ in the present embodiment)}$$

Moreover, the k(i, j) and d(i) in the above formula take the values shown in FIG. 12.

Next, because the FLH(i) of the above formula is a linear value, the value is again converted to a logarithmically compressed value as shown in the following formula.

$$FH(i) \leftarrow \text{Log}_2 FLH(i)$$

In this way, the filter operation at Step S204 is performed.

Successively, at Step S205, the camera micro computer 100 performs the operation of the reflected light amount of the object in each of the photometry areas S01-S15 at the time of the pre-emission on the basis of the FP(i) and the FH(i) acquired by the filter operations, namely the camera micro computer 100 extracts the luminance values only for the reflected light at the time of the pre-emission.

And the camera micro computer 100 stores the acquired luminance value only for the reflected light at the time of the pre-emission in each of the photometry areas S01-S15 into the RAM built in the camera micro computer 100. At this time, the camera micro computer 100 stores the luminance value only for the reflected light at the time of the pre-emission in each of the photometry areas S01-S15 calculated in accordance with, for example, the formula shown in the following.

$$D(i) \leftarrow \text{Log}_2(2^{FH(i)} - 2^{FP(i)}) \text{ (here, } i=1\text{-}15 \text{ in the present embodiment)}$$

In addition, because the FP(i) and the FH(i) are respective logarithmically compressed values in the above formula, the calculation of the D(i) is executed by taking a difference after once operating on the exponentiated numbers to expand the compressed values, and then by executing the logarithmic compressions of the difference value.

Successively, at Step S206, the camera micro computer 100 computes a ratio between the luminance value of each of the photometry areas S01-S15 before the pre-emission and the luminance value of each of the photometry areas S01-S15 at the time of the pre-emission. The calculated ratio of the luminance value of each of the photometry areas S01-S15 is stored in the RAM built in the camera micro computer 100. At this time, the camera micro computer 100 stores the ratio of the luminance values of each of the photometry areas S01-S15 which has been calculated in accordance with, for example, the formula shown in the following.

$$R(i)=FH(i)-FP(i) \text{ (Here, } i=1\text{-}15 \text{ in the present embodiment)}$$

In addition, because the P(i) and the H(i) in the above formula are logarithmically compressed values, computing their difference is equivalent to computing their ratio.

Here, the reason why the ratio between the luminance value of each of the photometry areas S01-S15 before the pre-emission and that at the time of the pre-emission is operated is described in the following.

If it is supposed that an object in each of the photometry areas S01-S15 in the photographed screen is uniformly illuminated by some light source in the atmosphere when pre-emission is not performed, the luminance in each of the photometry areas S01-S15 is in proportion to the optical reflectance of the object.

Here, if the pre-emission is performed, the reflected light from the object is proportional to the minus square of the distance from the object, and is also proportional to the reflectance of the light of the object.

That is, computing the ratio between the luminance value of each of the photometry areas S01-S15 before the pre-emission and that at the time of the pre-emission is acquiring the value in proportion to the distance from the object to the minus second power. That is, the reason is that it can say that the distance from the object is equal in the area having the same R(i) value.

Successively, at Step S207, the camera micro computer 100 performs the operations of predetermined values LVL0 and LVL1 based on the information relative to the above distance of the object. In the following, the operation of the predetermined values LVL0 and LVL1 will be concretely described.

First, as the predetermined value LVL0, the operation of the following formula is performed.

$$LVL0=-\text{Log}_2(D) \times 2 + C2$$

After the camera micro computer 100 has acquired the absolute distance information (D) from the object with the lens micro computer 112 as described above, the predetermined value LVL0 is calculated according to the degree of the reflected luminance in the case of the object having a normal reflectance at the absolute distance.

Moreover, the C2 in the above formula is a value to be determined based on the light emission quantity of the pre-emission, and the C2 is determined to be slightly higher than the reflected luminance in the case of the object having the normal reflectance at the absolute distance information (D) from the object. The reason is that the absolute distance information (D) from the object includes some errors and variation, and that the C2 is made to be little higher than the reflected luminance for the errors to prevent the actual reflected light of the pre-emission from the object of the normal reflectance from becoming higher than the predetermined value LVL0. In addition, the predetermined value LVL0 is also a logarithmically compressed value.

Moreover, as the predetermined value LVL1, the following formula is used.

$$LVL1=LVL0-C3$$

In the above formula, the C3 is determined in consideration of the errors and the variation of the absolute distance information (D) from the object lest the actual reflected light of the pre-emission from the object having the normal reflectance should be less than the predetermined value LVL1. In addition, the predetermined value LVL1 is also a logarithmically compressed value.

Moreover, in a system in which the absolute distance information from the object is unknown, the predetermined value LVL0 is calculated in accordance with the following formula using a table 1 shown in FIG. 10.

$$LVL0=\text{table } 1(f)$$

Here, the letter f denotes a focal length, and table 1 denotes the table shown in FIG. 10.

For example, with reference to FIG. 10, in case of a taking lens having a focal length f of 28 mm, the reflected luminance in the case where the object having the normal reflectance is located at a distance of 0.5 m is set to the predetermined value LVL0. This means that the reflected light of the pre-emission from the object is lower than the predetermined value LVL0 because it does not almost happen to photograph the object located at a position nearer than 0.5 m in the case of performing the photography at this focal length. Similarly, the object is located at positions farther than the focal lengths such as a position distant is 0.8 m in case of a taking lens having the focal length f of 50 mm, and a position distant is 1.1 m in case of a taking lens having the focal length f of 85 mm, and it is that the reflected light of the pre-emission from the object is lower than the predetermined value LVL0.

Moreover, as the predetermined value LVL1, the operation of the following formula is executed.

$$LVL1=LVL0-C1$$

In the above formula, the C1 is determined lest the reflected light of the pre-emission from the object should be less than the predetermined value LVL1. For example, when the possibility of existence of an object located at a position farther than 3.2 m is small in case of a 50 mm lens, 6.4÷0.8=8, and the reflected light from the object becomes lower by six steps at the time of the distance of 8 times. Consequently, C1 takes a value of 6.

Successively, at Step S208, the camera micro computer 100 extracts only the photometry areas having the D(i)'s within a range between the predetermined values LVL0-LVL1 (predetermined range) in each of the photometry areas S01-S15.

Thereby, it is possible to exclude the photometry areas having very high D(i)'s caused by the regular reflection of glass and the photometry areas having very low D(i)'s caused by incomplete arrival of flash light, and to extract only the photometry areas having the possibility of the existence of the main object.

In addition, because the D(i) does not frequently differ from the value of the H(i) greatly, the D(i) may be replaced with the H(i) to be used at Step S208.

Successively, at Step S209, the camera micro computer 100 performs the following processing on the supposition that the probability that the object located at the nearest position is the main object is the highest.

The above R(i), which is the maximum ratio between the luminance value of each of the photometry areas S01-S15 before the pre-emission and that at the time of the pre-emission, among the photometry areas extracted at Step S208 is set as a base R to be used as a reference. And the camera micro computer 100 supposes that the object having the same R(i) as the base R is the main object.

Successively, at Step S210, the camera micro computer 100 acquires a difference (or a ratio) between the R(i) in each of the photometry areas S01-S15 and the base R in accordance with the formula shown in the following.

$$RR(i)=\text{base } R-R(i) \text{ (here, } i=1\text{-}15 \text{ in the present embodiment)}$$

At Step S210, as shown in the above formula, because both of the base R and the R(i) are logarithmically compressed values, actually the formula calculates the ratios between the photometry area at the distance of the reference (the photometry area of the base R) and the other photometry areas.

A photometry area having the little RR(i) value is an area in which the object exists at a distance equivalent to that of the supposed main object. Moreover, as the value RR(i) becomes positively larger, the photometry area becomes the one in which the object is located at a position where the distance from the camera is more distant from that of the supposed main object. On the contrary, as the value RR(i) becomes negatively larger, the object is located at a position where the distance from the camera is nearer than that of the supposed main object. In this case, the object may be an obstacle, or an abnormal value may be only shown owing to the regular reflection of glass.

Successively, at Step S211, the camera micro computer 100 acquires the weight coefficient at each of the photometry areas S01-S15 based on the value of the RR(i) in accordance with the formula shown in the following using a table 2 shown in FIG. 11.

$$W(i)=\text{table } 2 (RR(i)) \text{ (here, } i=1\text{-}15 \text{ in the present embodiment)}$$

First, examination of the values of the RR(i) within a range of from 0 to 0.2 non-inclusive in the table 2 shown in FIG. 11 shows that a weight coefficient W(i) is 12, which is the largest.

It is natural because the photometry area of the RR(i) within the range of from 0 to 0.2 non-inclusive is the photometry area supposed to be of the main object.

In the case where the RR(i) becomes gradually larger in a way of being within a range of from 0.4 to 0.6 non-inclusive, a range of from 0.6 to 0.8 non-inclusive, and so on, such photometry areas are ones in which the objects are located at positions where their distances from the camera gradually become larger than that of the supposed main object. Consequently, the weight coefficients W(i) gradually decrease to be 10, 8 and so on.

In this way, by decreasing the weight coefficient gradually, it is possible to prevent exposure unevenness (dispersion of the exposure of the flash) owing to the movement of the object at each chance of photography. Moreover, there can be obtained a photograph in which flash light sufficiently reaches a depth portion of the scene by performing averaging with weighting not only to the object located at the nearest position but also to the depth portion of the scene in the case of an object including the depth portion.

Moreover, because the objects may be obstacles or abnormal values due to the regular reflection of glass may be only shown, in the photometry areas in which the RR(i) become minus, the weight coefficients to such photometry areas are made to be smaller. However, the weighting is not made to become rapidly smaller in order to avoid the exposure unevenness mentioned above.

It is notable here that the photometry areas other than the photometry areas in which the main object may exist are excluded at the processing at Step S208, but the photometry areas to be the basis of determining the weight coefficients in the processing at Step S211 are all of the photometry areas S01-S15 of the photographed scene.

Successively, at Step S212, the camera micro computer 100 performs the operation of the weighted average of the reflected light in the object in accordance with the formula shown in the following.

$$AVE = \tau(D(i) \times W(i))/\Sigma W(i) \text{ (here, } i=1-15 \text{ in the present embodiment)}$$

It is possible to extract the main object in the areas located at the same distance from the camera in a good condition by the operation of the weighted average of the reflected light from the object using the above formula, and to perform the operation of obtaining the reflected light of the object with the main object being greatly weighted.

Successively, at Step S213, the camera micro computer 100 operates the emission light amount of the main light emission in accordance with the formula shown in the following.

$$\gamma = TARGET - AVE$$

Here, TARGET denotes the light amount of a target to acquire a proper exposure on the surface of the shutter, and the letter γ denotes a proper relative value of the emission light amount of the main light emission to the pre-emission to be transmitted from the camera micro computer 100 to the flash micro computer 200.

In embodiment of the present invention, a description is provided to the example of applying the present invention to the digital still camera of exposing the image capture device such as a CCD sensor, a CMOS sensor and the like as the image capture apparatus according to the present invention, but the present invention can be also applied to a single-lens reflex camera which is a film-based camera exposing a film.

Moreover, various methods have been proposed until now for the operation of determining the exposure value B of a camera after the filter operation of a photometry output. In the present invention, the method is not limited to the operation processing shown in the present embodiment, but various operation algorithms can be applied.

Moreover, in the present embodiment, two examples of the photometry modes of the spot photometry mode and the evaluation photometry mode for determining the exposure value relative to the shutter speed and the iris value have been mentioned. However, as a method to determine the exposure value as the light emission quantity of a flash, there is also a determination method of the light emission quantity using spot photometry, and the method is an application example of the embodiment of the present invention.

As described above, in the single-lens reflex camera according to the embodiment of the present invention, the inside of the photographed scene is divided into a plurality of photometry areas, and the photometry of the luminance of the object in each photometry area is performed with the multi-divided photometry sensor 7 (Step S121). Next, the photometry mode of the photometry using the multi-divided photometry sensor 7 is judged (Step S122).

And the exposure value B is determined according to the judged photometry mode (Step S123 and Step S124).

Moreover, in the single-lens reflex camera according to the embodiment of the present invention, the focus state at the distance measurement point in the photographed scene to the object is detected with the focus detection line sensor 29, the focus detection circuit 105 and the like (Step S103).

And the single-lens reflex camera performs the filer operation performing the averaging processing on the luminance value of each photometry area in which the photometry has been performed with the multi-divided photometry sensor 7, by taking into account the luminance values of the photometry areas adjacent to each photometry area (Step S124).

In the case where the photometry mode is judged to be the spot photometry mode (the first photometry mode) as the result of the judgment of the photometry mode at Step S122, the filter operation mentioned above is not performed, and the exposure value B is determined based on the luminance value at the predetermined photometry area including the distance measurement point mentioned above (Step S123).

In the case where the photometry mode is judged to be the evaluation photometry mode (the second photometry mode) as the result of the judgment of the photometry mode at Step S122, the filter operation mentioned above is performed to determine the exposure value B based on the operation result (Step S125).

Moreover, in the single-lens reflex camera according to the embodiment of the present invention, the luminance value of each photometry area subjected to the photometry with the multi-divided photometry sensor 7 is stored in the RAM built in the camera micro computer 100 as a compressed value (Step S121).

And in the filter operation at Step S123, the compressed value is returned to the luminance value of a linear value to perform the averaging processing, and the result value of the averaging processing is output as a compressed value.

Moreover, in the single-lens reflex camera according to the embodiment of the present invention, the exposure value B is made to be a value relative to a shutter speed and an iris value (Step S126). Moreover, as mentioned above, the exposure value B can be made to be a value relative to the light emission quantity of a flash.

According to the single-lens reflex camera according to the embodiment of the present invention, it becomes possible to realize proper exposure control having good responsibility in any photographing scenes. Furthermore, in case of forming the multi-divided photometry sensor 7 without using any area sensors such as a CCD sensor, the camera can be produced to be inexpensive.

Each means of FIGS. 1-3 constituting the image capture apparatus (single-lens reflex camera) according to the embodiment of the present invention, and each step of FIGS. 6-9 showing the control method of the image capture apparatus can be realized by the operation of a program stored in the RAM and the ROM of the computer. The program and the storage medium which records the program and can be read with the computer are included in the present invention.

To put it concretely, the program is recorded on the recording medium such as a CD-ROM, or is supplied to the computer through various transmission media.

As the recording medium recording the program, in addition to the CD-ROM, a flexible disk, a hard disk, a magnetic tape, a magneto-optical disk, a non-volatile memory card and the like can be used.

On the other hand, as the transmission medium of the program, a communication medium (a wired circuit using an optical fiber or the like, a wireless circuit and the like) in a computer network (a LAN, a WAN, a wireless communication network and the like) system for making the program information be propagated as a carrier wave to supply the program information can be used.

Moreover, in addition to the realization of the functions of the embodiment mentioned above by the execution of the read program by the computer, the functions can be also realized by the execution of a part or the whole actual processing by the OS or the like working on the computer.

Furthermore, the functions can be also realized by the execution of a part or the whole actual processing by the CPU or the like on a feature expansion board or the like after the program read from the recording medium has been written in a memory of the feature expansion board inserted into the computer or a feature expansion unit connected to the computer.

As described above, although the present invention has been described by way of preferable examples, the present invention is not limited to the above examples, and can be variously modified within the scope of claims.

This application claims priority from Japanese Patent Application No. 2005-234934 filed on Aug. 12, 2005, which is hereby incorporated by reference herein.

What is claimed is:

1. An image capture apparatus comprising:
   a photometry unit, which determines a luminance value in each of a plurality of photometry areas in an image sensing scene;
   a photometry mode determination unit, which determines a photometry mode of said image capture apparatus;
   a filter operation unit, which performs an operation on the luminance value of a photometry area by taking into account luminance values of photometry areas around the photometry area, thereby obtaining a processed luminance value; and
   an exposure value determination unit, which determines an exposure value by using the luminance value determined by said photometry unit and not subjected to the operation of said filter operation unit, as the luminance value in each of the plurality of photometry areas, when said photometry mode determination unit determines that the photometry mode is a first photometry mode, and when said photometry mode determination unit determines that the photometry mode is a second photometry mode, said exposure value determination unit determines the exposure value by using the processed luminance value determined by said filter operation unit, as the luminance value in each of the plurality of photometry areas.

2. The image capture apparatus according to claim 1, further comprising a focus detection unit, which detects a focus state of the object, at a focus state detection point in said image sensing scene, wherein said exposure value determination unit determines the exposure value based on the luminance value at a predetermined photometry area including the focus state detection point where said focus detection unit detects the focus state without using the operation result by said filter operation unit, when said photometry mode determining unit has determined the photometry mode as the first photometry mode.

3. The image capture apparatus according to claim 1, wherein when said photometry mode determination unit determines that the photometry mode is the second mode, said exposure value determination unit determines the exposure value by performing a weighting operation on a plurality of photometry areas in accordance with the second photometry mode after the operation performed by said filter operation unit.

4. The image capture apparatus according to claim 1, further comprising a storage unit, which stores, as a compressed value, the luminance value of each of the photometry areas the luminance-determination of which said photometry unit has performed, wherein said filter operation unit returns the compressed value stored in said storage unit to the luminance value of a linear value in advance, and then performs an operation taking into account the luminance value of the photometry areas around the photometry area, to output a value of a result of the operation as a compressed value.

5. The image capture apparatus according to claim 1, wherein the exposure value is at least one of a value relative to a shutter speed, a value relative to an iris value, and a value relative to a flash light emission quantity.

6. A control method of an image capture apparatus, comprising the steps:
   a luminance determining step for determining a luminance value in each of the photometry areas in an image sensing scene;
   a photometry mode determining step for determining a photometry mode;
   an operation performing step for performing an operation on the luminance value of a photometry area by taking into account luminance values of photometry areas around the photometry area, thereby obtaining a processed luminance value; and
   an exposure determining step for determining an exposure value by using the luminance value determined in said luminance determining step and not subjected to the operation in said operation performing step, as the luminance value in each of the plurality of photometry areas, when said photometry mode determining step determines that the photometry mode is a first photometry mode, and when said photometry mode determining step determines that the photometry mode is a second photometry mode, said exposure determining step determines the exposure value by using the processed luminance value determined in said operation performing step, as the luminance value in each of the plurality of photometry areas.

7. The control method according to claim 6, wherein when said determining step determines that the photometry mode is the second mode, said exposure-value determining step determines the exposure value by performing a weighting operation on a plurality of photometry areas in accordance with the second photometry mode after the operation performed in said operation performing step.

* * * * *